United States Patent
Sun et al.

(10) Patent No.: US 10,374,840 B1
(45) Date of Patent: *Aug. 6, 2019

(54) AUTO-DETECTION OF REPEATED SIGNALS

(71) Applicant: Marvell International Ltd., Hamilton (BM)

(72) Inventors: Yakun Sun, San Jose, CA (US); Mingguang Xu, San Jose, CA (US); Hongyuan Zhang, Fremont, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 15/980,650

(22) Filed: May 15, 2018

Related U.S. Application Data

(63) Continuation of application No. 15/611,656, filed on Jun. 1, 2017, now Pat. No. 9,979,569, which is a
(Continued)

(51) Int. Cl.
*H04L 5/00* (2006.01)
*H04L 25/03* (2006.01)
*H04W 84/12* (2009.01)

(52) U.S. Cl.
CPC .. *H04L 25/03171* (2013.01); *H04L 25/03012* (2013.01); *H04W 84/12* (2013.01); *H04L 5/0048* (2013.01)

(58) Field of Classification Search
USPC .............. 375/342, 136; 370/512, 328, 338
See application file for complete search history.

(56) References Cited

U.S. PATENT DOCUMENTS

| 7,478,314 B1 | 1/2009 | Cheong et al. |
| 7,599,332 B2 | 10/2009 | Zelst et al. |

(Continued)

FOREIGN PATENT DOCUMENTS

| WO | WO2012122119 | 9/2012 |
| WO | WO2013152111 | 10/2013 |
| WO | WO2014183059 | 11/2014 |

OTHER PUBLICATIONS

IEEE Std 802.11 b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHZ Band," The Institute of Electrical and Electronics Engineers, Inc., pp. 1-89 (Sep. 1999).

(Continued)

*Primary Examiner* — Eva Y Puente

(57) ABSTRACT

Systems and techniques relating to repeated signal detection are described. A described system includes a receiver to receive a frame including first and second portions, the first portion including first and second signal fields; a detector to determine a first decision metric component based on a hypothesis that the second signal field is a repeated version of the first signal field, determine a second decision metric component based on a hypothesis that the second signal field is not the repeated version, and make a determination, based on the first and second decision metric components, of whether the second signal field is the repeated version; and a decoder to process the second portion in accordance with a first format if the second signal field is not the repeated
(Continued)

version, and to decode the second portion in accordance with a second format if the second signal field is the repeated version.

20 Claims, 9 Drawing Sheets

Related U.S. Application Data continuation of application No. 15/017,343, filed on Feb. 5, 2016, now Pat. No. 9,674,011.

(60) Provisional application No. 62/114,239, filed on Feb. 10, 2015.

(56) References Cited

U.S. PATENT DOCUMENTS

| | | | |
|---|---|---|---|
| 7,742,390 B2 | 6/2010 | Mujtaba | |
| 7,974,225 B2 | 7/2011 | Kasher | |
| 8,144,647 B2 | 3/2012 | Nabar et al. | |
| 8,201,065 B1 | 6/2012 | Cheong et al. | |
| 8,391,333 B2* | 3/2013 | Saitou | H04B 1/70735 375/136 |
| 8,619,907 B2 | 12/2013 | Mujtaba et al. | |
| 8,627,171 B2 | 1/2014 | Pi | |
| 8,681,757 B2 | 3/2014 | Lee et al. | |
| 9,979,569 B1* | 5/2018 | Sun | H04L 25/03171 |
| 2001/0015988 A1* | 8/2001 | Sawada | H04L 7/042 370/512 |
| 2003/0220771 A1* | 11/2003 | Vaidyanathan | G06F 19/22 703/2 |
| 2005/0117674 A1* | 6/2005 | Jeon | H04L 7/041 375/342 |
| 2008/0039107 A1* | 2/2008 | Ma | H04B 7/02 455/450 |
| 2009/0196163 A1 | 8/2009 | Du | |
| 2010/0046358 A1 | 2/2010 | Van Nee | |
| 2010/0046656 A1 | 2/2010 | Van Nee et al. | |
| 2010/0091673 A1 | 4/2010 | Sawai et al. | |
| 2010/0260159 A1 | 10/2010 | Zhang et al. | |
| 2010/0309834 A1 | 12/2010 | Fischer et al. | |
| 2011/0002219 A1 | 1/2011 | Kim et al. | |
| 2011/0032875 A1 | 2/2011 | Ereeg | |
| 2012/0195391 A1 | 8/2012 | Zhang et al. | |
| 2012/0201316 A1 | 8/2012 | Zhang et al. | |
| 2012/0294294 A1 | 11/2012 | Zhang | |
| 2012/0300874 A1 | 11/2012 | Zhang | |
| 2012/0327871 A1 | 12/2012 | Ghosh et al. | |
| 2013/0202001 A1 | 8/2013 | Zhang | |
| 2013/0259017 A1 | 10/2013 | Zhang et al. | |
| 2014/0337690 A1 | 11/2014 | Zhang | |
| 2015/0009894 A1* | 1/2015 | Vermani | H04L 1/0072 370/328 |
| 2016/0112851 A1* | 4/2016 | Li | H04L 69/18 370/338 |

OTHER PUBLICATIONS

IEEE Std 802.11g/02.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band, " The Institute of Electrical and Electronics Engineers, Inc., pp. 1-53 (May 2002).

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," The Institute of Electrical and Electronics Engineers, Inc., pp. 1-69 (Apr. 2003).

IEEE Std. 802.11 n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., DD. 1-502 (Oct. 2009).

Francis, Michael, "Viterbi Decoder Block Decoding—Trellis Termination and Tail Biting," Xilinx XAPP551 v2.0, DD. 1-21 (Jul. 30, 2010).

van Nee, et al. "The 802.11 n MIMO-OFDM Standard for Wireless LAN and Beyond," Wireless Personal Communications, vol. 37, pp. 445-453 (Jun. 2006).

Invitation to Pay Additional Fees and Partial International Search Report for PCT Application No. PCT/US2014/037534, 9 pages (dated Aug. 21, 2014).

International Search Report and Written Opinion in International Application No. PCT/US2014/037534, dated Oct. 21, 2014 (21 pages).

IEEE Std 802.11ac/D3.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-385 (Jun. 2012).

IEEE Std 802.11ac/D4.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-408 (Oct. 2012).

IEEE Std 802.11ac/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-440 (Jan. 2013).

de Vegt, "Potential Compromise for 802.11 ah Use Case Document", Institute of Electrical and Electronics Engineers, doc. No. IEEE 802.11-11/0457r0, pp. 1-27 (Mar. 2011).

Lee et al., "TGaf PHY proposal," The Institute of Electrical and Electronics Engineers, doc. No. IEEE 802.11-12/0809r5, pp. 1-43 (Jul. 10, 2012).

Park, "Proposed Specification Framework for TGah," The Institute of Electrical and Electronics Engineers, doc. No. IEEE 802.11--yy/xxxxr05, pp. 1-12 (Jan. 2012).

Park, "Proposed Specification Framework for TGah," The Institute of Electrical and Electronics Engineers, doc. No. IEEE 802.11-11/1137r6, pp. 1-13 (Mar. 2012).

Park, Proposed Specification Framework for TGah D9.x, The Institute of Electrical and Electronics Engineers, doc. No. IEEE 802.11-yy/xxxxrO, pp. 1-30 (Jul. 2012).

Park, "Proposed Specification Framework for TGah," The Institute of Electrical and Electronics Engineers, doc. No. IEEE 802.11-11/1137r11, pp. 1-36 (Sep. 2012).

Park, "Specification Framework for TGah," The Institute of Electrical and Electronics Engineers, doc. No. IEEE 802.11-11/1137r13, DD. 1-58 (Jan. 14, 2013).

Perahia, et al., "Gigabit Wireless LANs: an overview of IEEE 802.11 ac and 802.11 ad," ACM SIGMOBILE Mobile Computing and Communications Review, vo. 15, No. 3, pp. 23-33 (Jul. 2011).

(56) References Cited

OTHER PUBLICATIONS

Shao, "Channel Selection for 802.11ah," doc.: IEEE 802.11-12/0816r0, pp. 1-11 (Jul. 2012).
Stacey et al., "IEEE P802.11, Wireless LANs, Proposed TGac Draft Amendment," Institute of Electrical and Electronics Engineers, doc. No. IEEE 802.11-10, 1361 r3 pp. 1-154 (Jan. 2011).
Stacey et al., "Specification Framework for TGac," document No. IEEE 802.11-09/0992r20, Institute tor Electrical and Electronics Engineers, pp. 1-49, (Jan. 18, 2011).
Taghavi et al., "Introductory Submission for TGah," doc. No. IEEE 802.11-11/0062r0, Institute for Electrical and Electronics Engineers, pp. 1-5 (Jan. 14, 2011).
Vermani, et al. "Spec Framework Text for PHY Numerology," The Institute of Electrical and Electronics Engineers, doc. No. IEEE 802.11-11/1311 rO, DD. 1-5 (Sep. 2011).
Vermani, et al. "Preamble Format for 1 MHz," The Institute of Electrical and Electronics Engineers, doc. No. IEEE 802.11-11/1482r2, DD. 1-30 (Nov. 2011).
Yu et al., "Coverage extension for IEEE802.11ah," The Institute of Electrical and Electronics Engineers, doc. No. IEEE 802.11-11/0035r1, pp. 1-10 (Jan. 2011).
Zhang et al., "11ah Data Transmission Flow," The Institute of Electrical and Electronics Engineers, doc. No. IEEE 802.11-11/1484r1, pp. 1-15 (Nov. 2011).
Zhang et al., 1 MHz Waveform in Wider BW, The Institute of Electrical and Electronics Engineers, doc. No. IEEE 802.11-12/0309r1, pp. 1-10 (Mar. 2012).
Zhang et al., "Beamforming Feedback for Single Stream," The Institute of Electrical and Electronics Engineers, doc. No. IEEE 802.11-12/1312r0, pp. 1-22 (Nov. 12, 2012).
International Preliminary Report on Patentability and Written Opinion in corresponding International Application No. PCT/US2013/035132 dated Oct. 7, 2014 (7 pages).
Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).
IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," The Institute of Electrical and Electronics Engineers, Inc., (1999).
IEEE Std 802.11ac/D2.1 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Mar. 2012.
IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., Jan. 2012.
IEEE Std 802.11b-1999/Cor 1-2001 (Corrigendum to IEEE Std 802.11 b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," The Institute of Electrical and Electronics Engineers, Inc., Nov. 7, 2001, 23 pages.
International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, The Institute of Electrical and Electronics Engineers, Inc., (1999), 250 pages.
IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," The Institute of Electrical and Electronics Engineers, Inc., (1999) Reaffirmed Jun. 12, 2003.
S. A. Mujtaba, "IEEE P802.11—Wireless LANs, TGn Sync Proposal Technical Specification," The Institute of Electrical and Electronics Engineers, Inc., doc.: IEEE 802.11-04/0889r6, May 2005, pp. 1-131.
"IEEE P802.11 n™/D3.00, Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., Sep. 2007, 544 pages.
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), The Institute of Electrical and Electronics Engineers, pp. 207-211 (2009).
Imashioya et al., "RTL Design of 1.2 Gbps MIMO WLAN System and Its Business Aspect," IEEE 9th Int'l Symposium on Communications and Information Technology (ISCIT 2009), The Institute of Electrical and Electronics Engineers, pp. 296-301 (2009).
Syafei et al., "A Design of Next Generation Gigabit MIMO Wireless LAN System ," IEEE 12th Int'l Conference on Advanced Communication Technology, Feb. 7-10, 2010, pp. 941-946.
Syafei et al., "A Gigabit MIMO WLAN System with International Standardization Strategy," IEEE Int'l Symposium on Intelligent Signal Processing and Communication Systems (ISPACS 2009), The Institute of Electrical and Electronics Engineers, pp. 228-231 (2009).
Kim et al., "Phase Tracking During VHT-LTF," Doc. No. IEEE 802.11-10/0771 rO, The Institute of Electrical and Electronics Engineers, Inc., Jul. 2010, 19 pages.
van Zelst et al., "Pilot Sequence for VHT-DATA," Doc. No. IEEE 802.11-10/0811 r1, The Institute of Electrical and Electronics Engineers, Inc., Jul. 2010, 10 pages.
IEEE Std 802.11af/D1 .05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," The Institute of Electrical and Electronics Engineers, Inc., Nov. 2011, 123 pages.
International Search Report issued in corresponding PCT/US2013/035132, dated Jun. 24, 2013, 4 pages.
U.S. Appl. No. 14/523,678, "Range Extension PHY", Hongyuan Zhang, Oct. 24, 2014.
U.S. Appl. No. 14/582,568, "Systems and Methods for Introducing Time Diversity in WiFi Transmissions", Yakun Sun, Dec. 24, 2014.

* cited by examiner

AUTO-DETECTION OF REPEATED SIGNALS

CROSS REFERENCE TO RELATED APPLICATIONS

This disclosure is a continuation of and claims the benefit of the priority of U.S. patent application Ser. No. 15/611,656 filed Jun. 1, 2017, titled "Auto-Detection of Repeated Signals," which claims the benefit of the priority of U.S. patent application Ser. No. 15/017,343 filed Feb. 5, 2016, titled "Auto-Detection of Repeated Signals" (now U.S. Pat. No. 9,674,011), which claims the benefit of the priority of U.S. Provisional Application Ser. No. 62/114,239 filed Feb. 10, 2015, titled "Auto-Detection of Repeated Signals." The above-identified applications are incorporated herein by reference in their entirety.

BACKGROUND

Wireless Local Area Networks (WLANs) include multiple wireless communication devices that communicate over one or more wireless channels. A wireless communication device called an access point (AP) provides connectivity with a network, such as the Internet, to other wireless communication devices, e.g., client stations or access terminals (AT). Various examples of wireless communication devices include mobile phones, smart phones, wireless routers, and wireless hubs. In some cases, wireless communication electronics are integrated with data processing equipment such as laptops, personal digital assistants, and computers.

Wireless communication systems such as WLANs can use one or more wireless communication technologies such as orthogonal frequency division multiplexing (OFDM). In an OFDM based wireless communication system, a data stream can be split into multiple data substreams. Such data substreams are sent over different OFDM subcarriers, which can be referred to as tones or frequency tones. WLANs such as those defined in the Institute of Electrical and Electronics Engineers (IEEE) wireless communications standards, e.g., IEEE 802.11a, IEEE 802.11n, and IEEE 802.11ac, can use OFDM to transmit and receive signals.

SUMMARY

The present disclosure includes systems and techniques related to repeated signal detection. According to an aspect of the described systems and techniques, a technique includes receiving a signal including a first portion and a second portion, the first portion including a first received symbol and a second received symbol; detecting whether the first received symbol is repeated as the second received symbol using a maximum a posterior decision metric including a first component and a second component, the first component contributing to the decision metric in accordance with the first received symbol being repeated as the second received symbol, and the second component contributing to the decision metric in accordance with the first received symbol not being repeated as the second received symbol; determining a format based on whether or not the first received symbol was repeated; and processing the second portion of the signal in accordance with the format, as determined.

This and other implementations can include one or more of the following features. The detecting can include selecting a first known symbol from a group of known symbols that maximizes the first component; and selecting a pair of second known symbols, both being different from each other, from the group of known symbols that maximizes the second component. Some implementations can include determining an equalized version of the first received symbol based on a first wireless channel matrix associated with the first received symbol to produce a first equalized symbol; and determining an equalized version of the second received symbol based on a second wireless channel matrix associated with the second received symbol to produce a second equalized symbol. The detecting can include using the first equalized symbol and the second equalized symbol.

Some implementations can include determining an average noise power among tones of the first received symbol and tones of the second received symbol. The average noise power can be applied within the first component and the second component. Some implementations can include determining a detection threshold parameter based on one or more channel matrices and one or more minimal distances between points within a symbol constellation. The detecting can include making a comparison between the decision metric and the detection threshold parameter. Some implementations can include determining a first hard decision output based on a combination of the first received symbol and the second received symbol, the first component being based on the first hard decision output; and determining second hard decision outputs respectively based on the first received symbol and the second received symbol, the second component being based on the second hard decision outputs.

Some implementations can include collecting, in a time domain, first samples associated with the first received symbol; and collecting, in the time domain, second samples associated with the second received symbol. The detecting can include determining the first component based on a summation of products between the first samples and the second samples, and determining the second component based on normalized versions of the first samples and normalized versions of the second samples.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

A device can include a receiver configured to receive a signal including a first portion and a second portion, the first portion including a first received symbol and a second received symbol; and a processor coupled with the receiver. The processor can be configured to determine whether the first received symbol is repeated as the second received symbol using a maximum a posterior decision metric comprising a first component and a second component, the first component contributing to the decision metric in accordance with the first received symbol being repeated as the second received symbol, and the second component contributing to the decision metric in accordance with the first received symbol not being repeated as the second received symbol. The processor can be configured to determine a format based on whether or not the first received symbol was repeated and process the second portion of the signal in accordance with the format, as determined.

In some implementations, the processor is configured to select a first known symbol from a group of known symbols that maximizes the first component, and select a pair of second known symbols, both being different from each other, from the group of known symbols that maximizes the second component. In some implementations, the processor is configured to determine an equalized version of the first received symbol based on a first wireless channel matrix associated with the first received symbol to produce a first equalized symbol. The processor can be configured to determine an equalized version of the second received symbol based on a second wireless channel matrix associated with the second received symbol to produce a second equalized symbol. The processor can be configured to use the first equalized symbol and the second equalized symbol to determine whether the first received symbol is repeated as the second received symbol.

In some implementations, the processor is configured to determine an average noise power among tones of the first received symbol and tones of the second received symbol. The average noise power can be applied within the first component and the second component. In some implementations, the processor is configured to determine a detection threshold parameter based on one or more channel matrices and one or more minimal distances between points within a symbol constellation, and make a comparison between the decision metric and the detection threshold parameter. In some implementations, the processor is configured to determine a first hard decision output based on a combination of the first received symbol and the second received symbol, the first component being based on the first hard decision output, wherein the processor is configured to determine second hard decision outputs respectively based on the first received symbol and the second received symbol, the second component being based on the second hard decision outputs.

In some implementations, the processor is configured to collect, in a time domain, first samples associated with the first received symbol, and collect, in the time domain, second samples associated with the second received symbol. The processor can be configured to determine the first component based on a summation of products between the first samples and the second samples, and determine the second component based on normalized versions of the first samples and normalized versions of the second samples.

A system can include circuitry to receive a signal comprising a first portion and a second portion, the first portion comprising a first received symbol and a second received symbol; a detector that is configured to determine whether the first received symbol is repeated as the second received symbol using a maximum a posterior decision metric comprising a first component and a second component, wherein the first component contributes to the decision metric in accordance with the first received symbol being repeated as the second received symbol, and the second component contributes to the decision metric in accordance with the first received symbol not being repeated as the second received symbol; and a decoder that is configured to process the second portion of the signal in accordance with a format determined based on whether or not the first received symbol was repeated.

In some implementations, the detector is configured to select a first known symbol from a group of known symbols that maximizes the first component, and select a pair of second known symbols, both being different from each other, from the group of known symbols that maximizes the second component. In some implementations, the detector is configured to determine an equalized version of the first received symbol based on a first wireless channel matrix associated with the first received symbol to produce a first equalized symbol, wherein the detector is configured to determine an equalized version of the second received symbol based on a second wireless channel matrix associated with the second received symbol to produce a second equalized symbol. The detector can be configured to use the first equalized symbol and the second equalized symbol to determine whether the first received symbol is repeated as the second received symbol.

In some implementations, the detector is configured to determine a detection threshold parameter based on one or more channel matrices and one or more minimal distances between points within a symbol constellation, and make a comparison between the decision metric and the detection threshold parameter. In some implementations, the detector is configured to determine a first hard decision output based on a combination of the first received symbol and the second received symbol, the first component being based on the first hard decision output. The detector can be configured to determine second hard decision outputs respectively based on the first received symbol and the second received symbol, the second component being based on the second hard decision outputs. In some implementations, the detector is configured to collect, in a time domain, first samples associated with the first received symbol, and collect, in the time domain, second samples associated with the second received symbol. The detector can be configured to determine the first component based on a summation of products between the first samples and the second samples, and determine the second component based on normalized versions of the first samples and normalized versions of the second samples.

The described systems and techniques can result in one or more of the following advantages. A described technology can reduce the complexity of implementing repeated signal detection and format determination. A described technology can optimize the reliability of detecting the repeated signal by minimizing the probabilities for both miss detection, and false triggering, and at the same time reduce the complexity of implementing repeated signal detection and format determination.

Details of one or more implementations are set forth in the accompanying drawings and the description below. Other features and advantages may be apparent from the description and drawings, and from the claims.

DRAWING DESCRIPTIONS

Figure 3A:
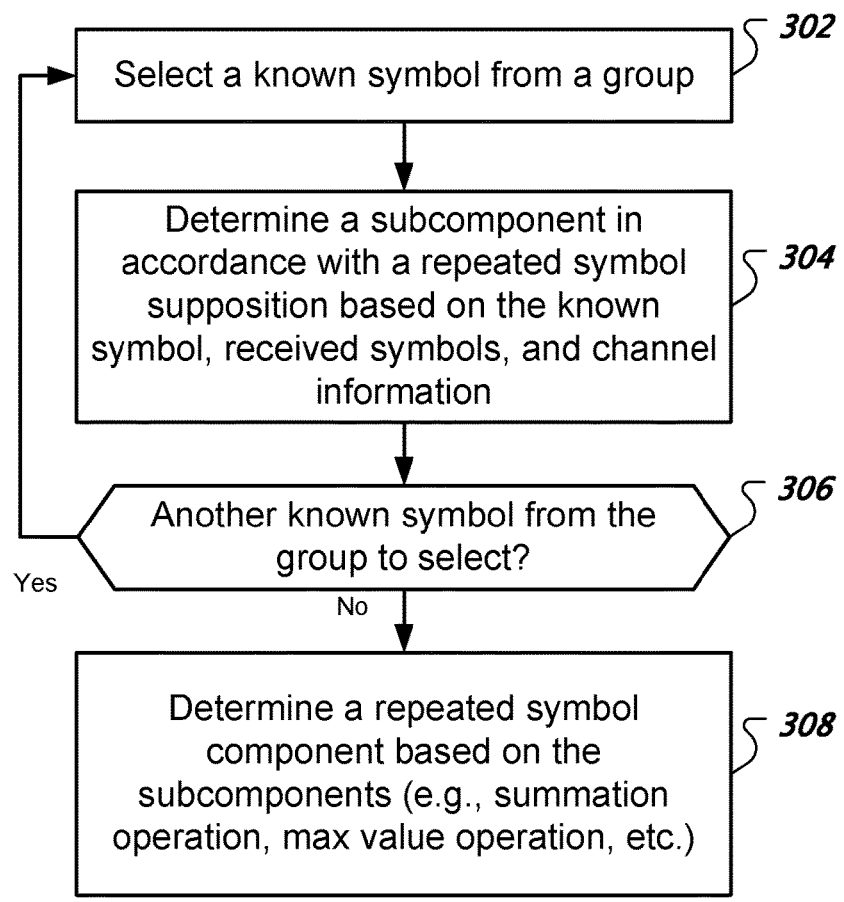
Figure 3B:
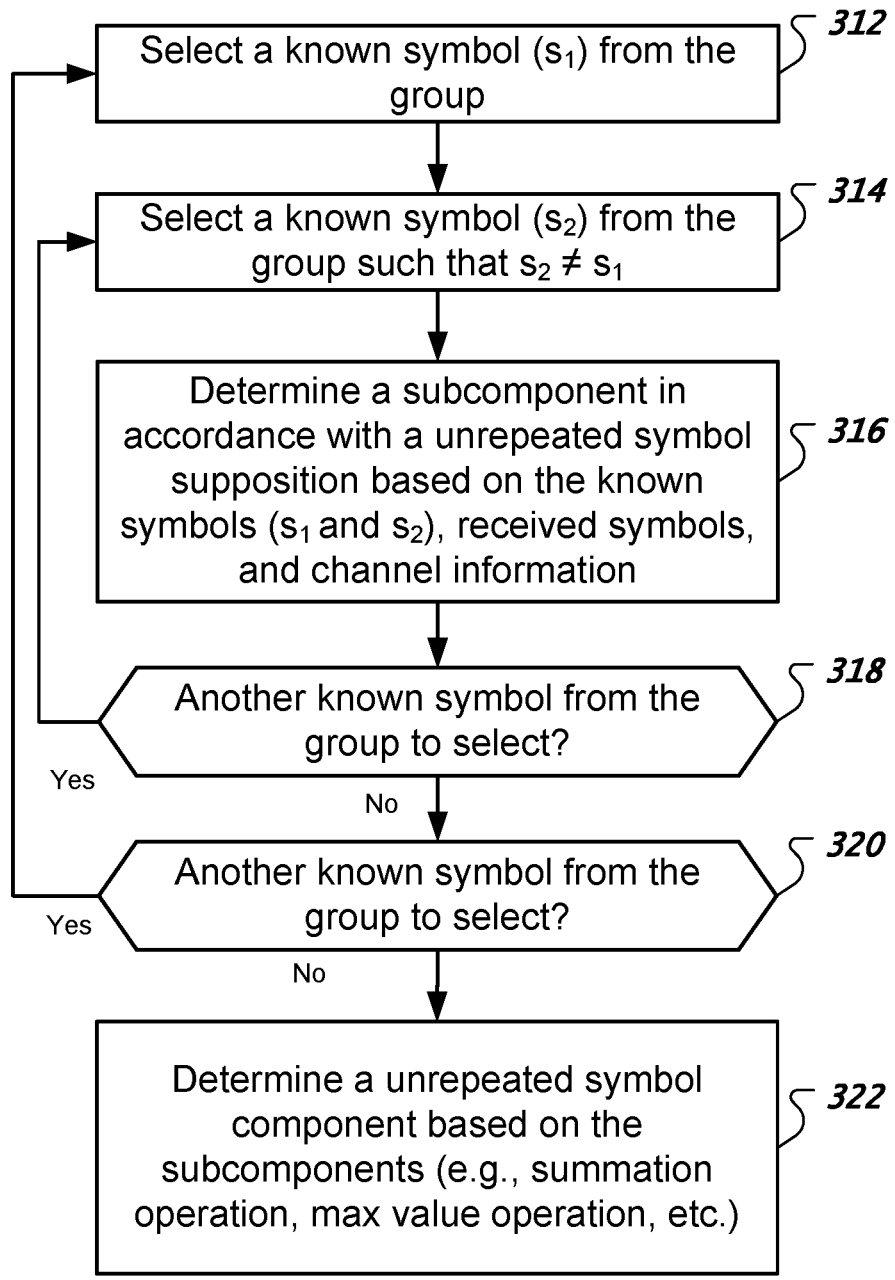
Figure 3C:
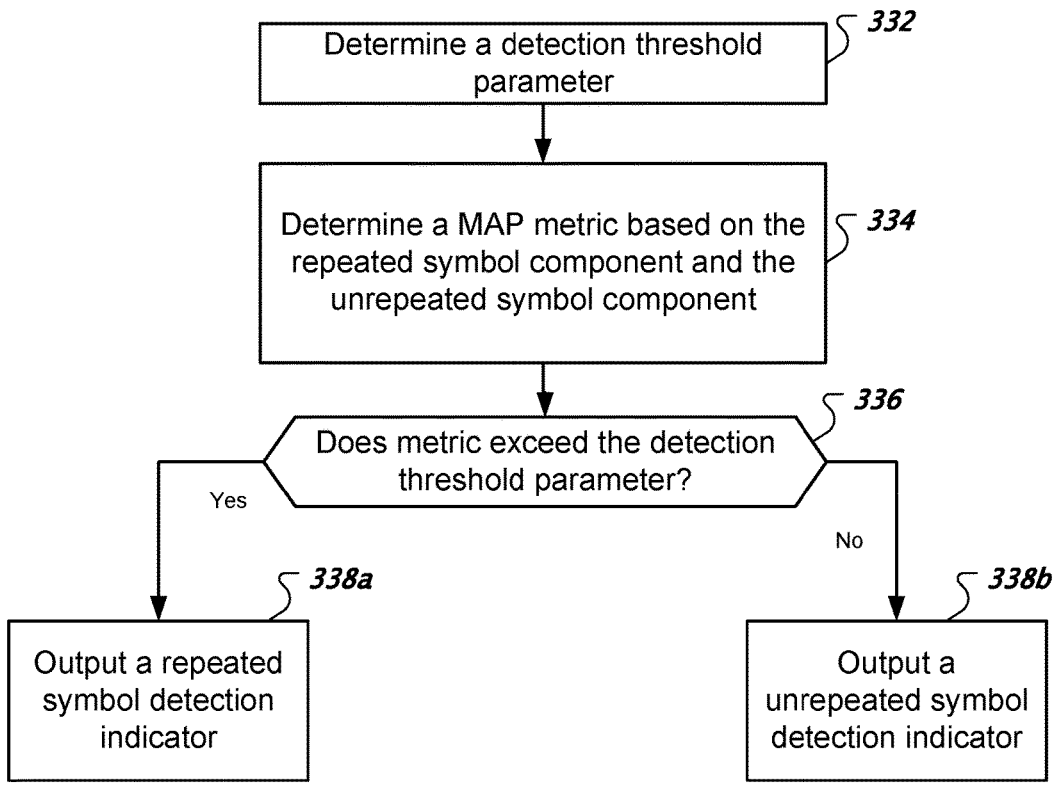

FIGS. 3A, 3B, and 3C show different flowcharts of another example of a signal repetition autodetection process.

Figure 4:
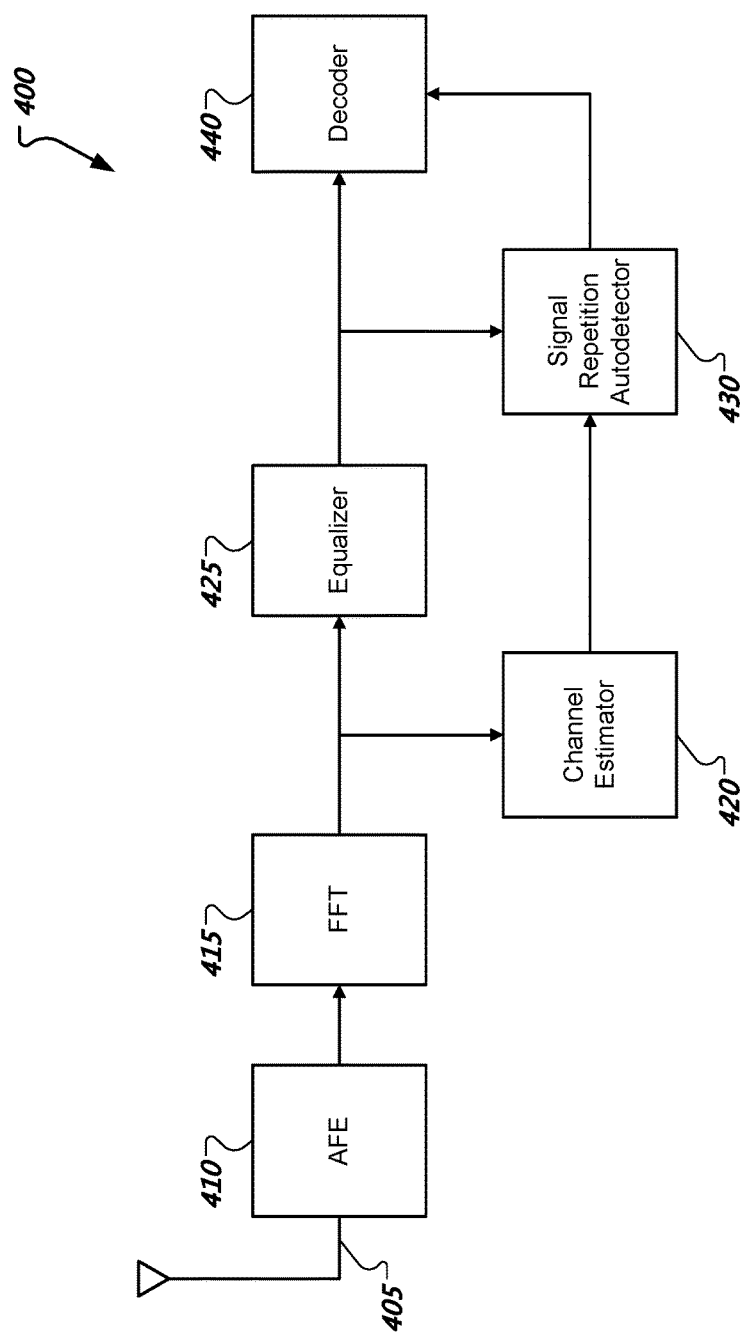

FIG. 4 shows an architecture of an example of a receiver that is configured to perform a frequency domain autodetection technique that uses an equalizer output.

Figure 5:
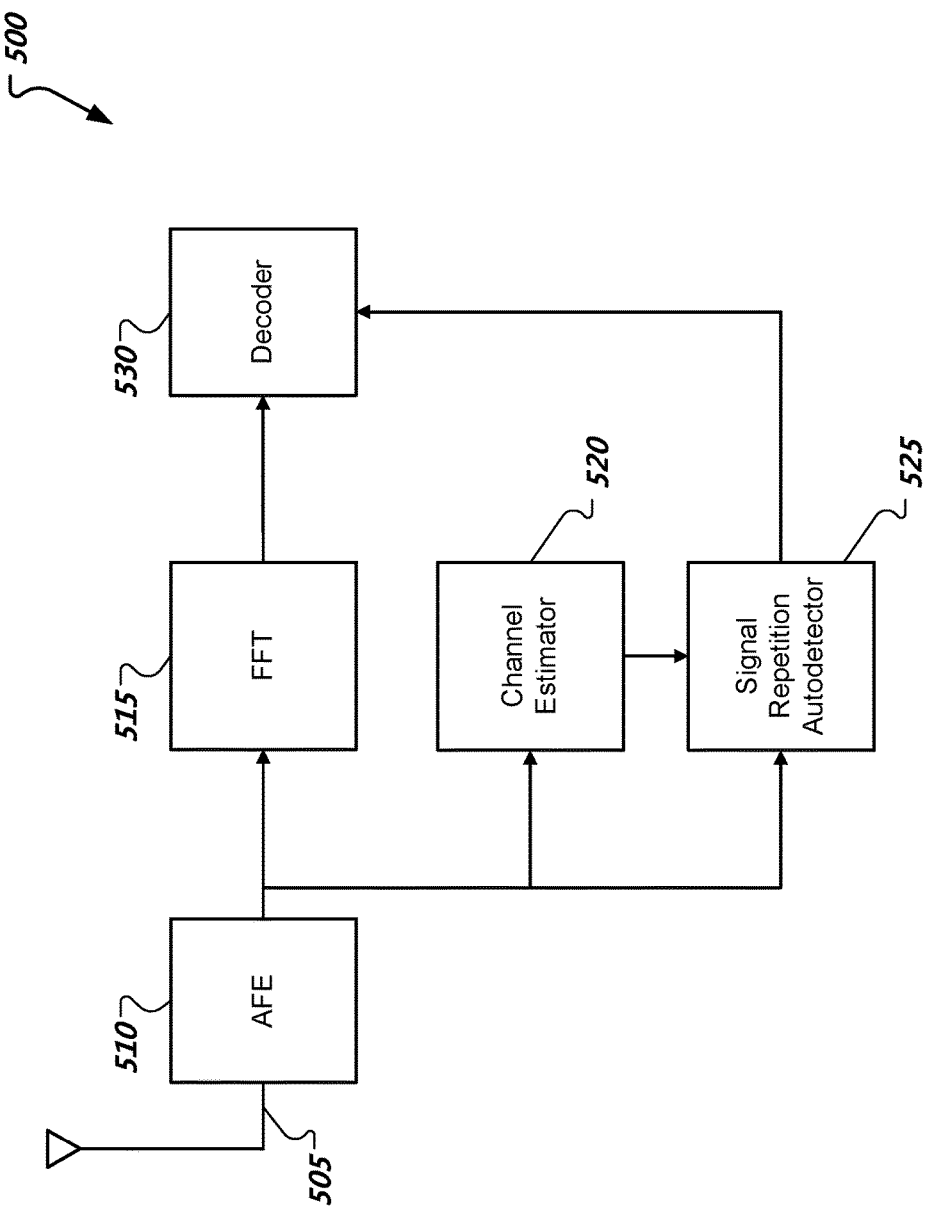

FIG. 5 shows an architecture of an example of a receiver that is configured to perform a time domain autodetection technique.

Figure 6A:
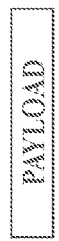
Figure 6B:

FIGS. 6A and 6B show different examples of a frame layout with a repeated symbol in a header portion of a frame.

Figure 7:
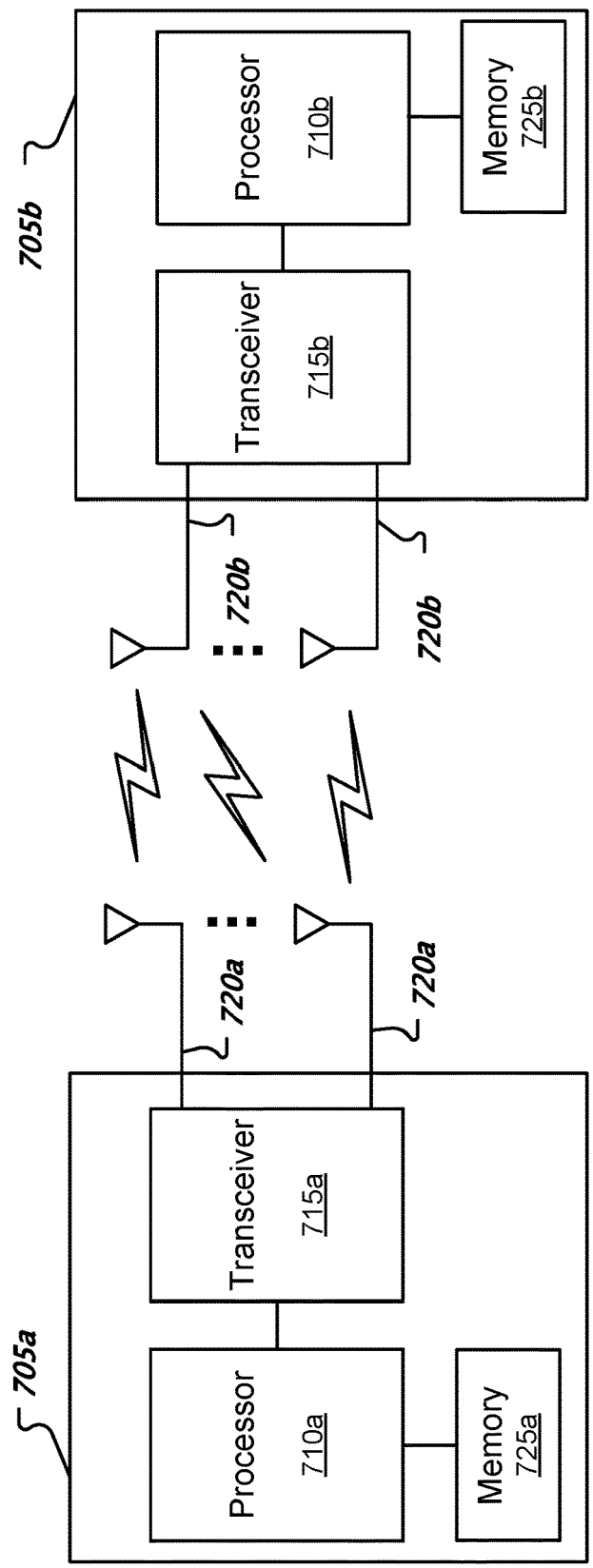

FIG. 7 shows an example of a wireless network with two wireless communication devices.

Like reference symbols in the various drawings indicate like elements.

DETAILED DESCRIPTION

A wireless communication system can include a multi-mode frame format which is indicated by a signal repetition, e.g., repeated header symbol, without explicit signaling. For example, a next generation of one or more wireless standards, such as an IEEE 802.11 standard, may use signal repetition to indicate that a frame is a next generation frame. A specific header field symbol that is not subsequently repeated can indicate a legacy frame format, whereas if that specific header field symbol is subsequently repeated, this can indicate a next generation frame format. Such an indication can be used to properly decode a data payload portion of a frame. A device can detect a signal repetition based on a frequency domain auto-detection technique or a time domain auto-detection technique. In some implementations, auto-detection techniques can use a maximum a posteriori (MAP) estimation to determine whether a symbol has been repeated.

Figure 1:
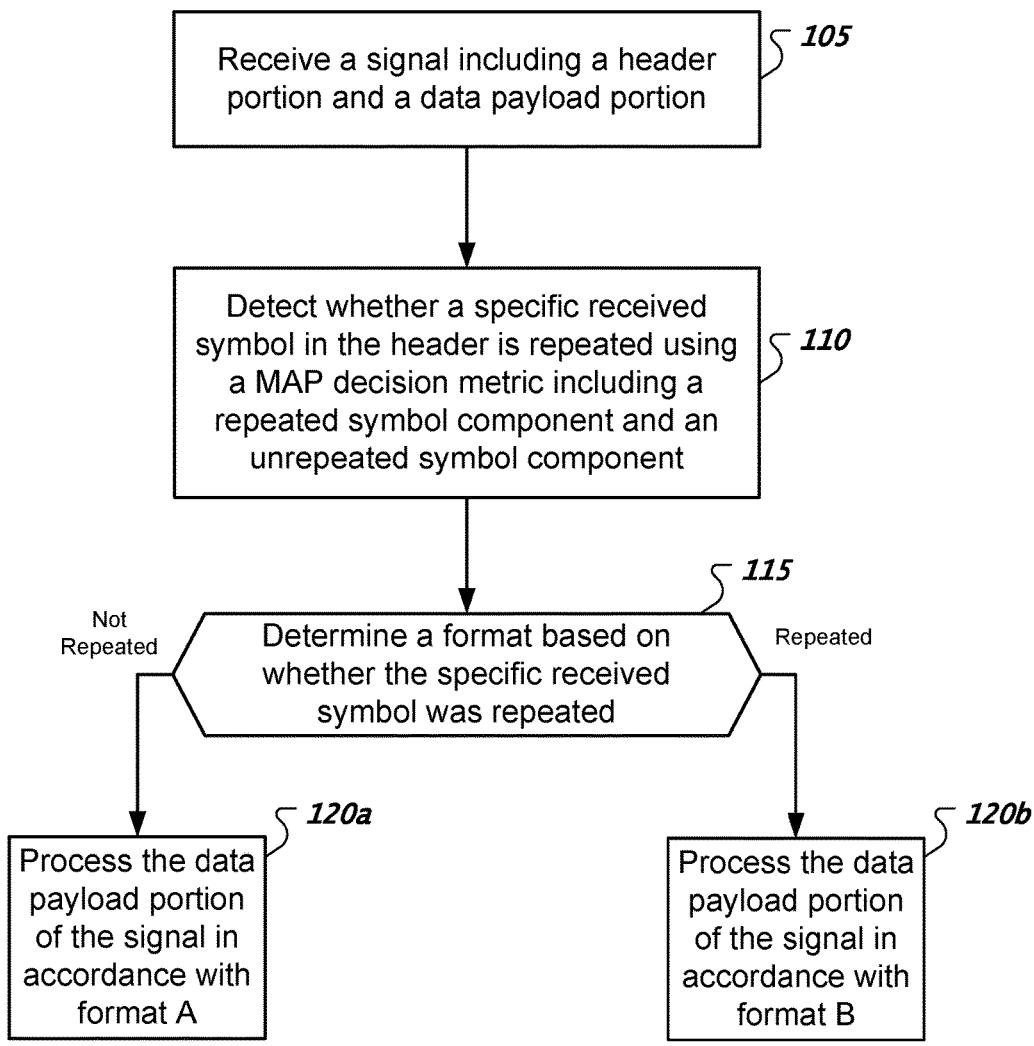
FIG. 1 shows a flowchart of an example of a signal repetition autodetection process.

FIG. 1 shows a flowchart of an example of a signal repetition autodetection process. A wireless device can use a signal repetition autodetection process to detect a repeated symbol. At 105, the process receives a signal including a header portion and a data payload portion. Receiving a signal can include receiving samples corresponding to symbols within a header portion of a frame and samples corresponding to symbols within a data payload portion of a frame.

At 110, the process detects whether a specific received symbol in the header is repeated using a MAP decision metric including a repeated symbol component and an unrepeated symbol component. The repeated symbol component contributes to the metric in accordance with the received symbol being repeated. The unrepeated symbol component contributes to the metric in accordance with the received symbol not being repeated. In some implementations, the process uses two or more adjacent symbols starting at a specific location, e.g., time index, within a header portion of a frame. In some implementations, the process uses two or more non-adjacent symbols starting at a specific location within a header portion of a frame. In some implementations, the detection can include using a frequency domain autodetection technique. In some implementations, the detection can include using a time domain autodetection technique.

At 115, the process determines a format based on whether the specific received symbol was repeated. If the symbol was not repeated, then at 120a, the process processes the second portion of the signal in accordance with format A. If the symbol was repeated, then at 120b, the process processes the second portion of the signal in accordance with format B. In some implementations, format A and format B are different versions of a wireless standard such as a legacy version and a next generation version.

Figure 2:
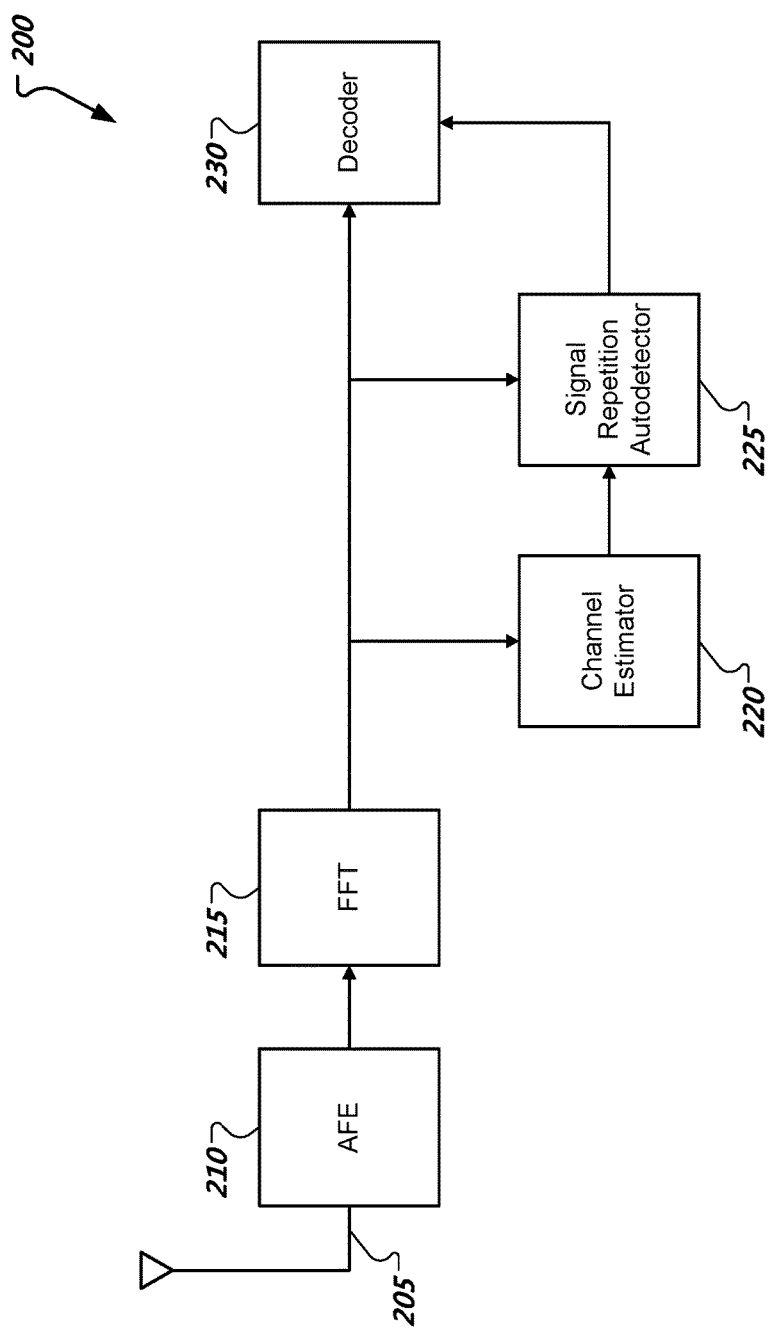
FIG. 2 shows a high-level architecture of an example of a receiver that is configured to perform a frequency domain autodetection technique.

FIG. 2 shows a high-level architecture of an example of a receiver 200 that is configured to perform a frequency domain autodetection technique. The receiver 200 can be included in a device such as a wireless communication device. The receiver 200 includes one or more antennas 205, an analog front end (AFE) 210, a Fourier transform block such as a Fast Fourier Transformation (FFT) block 215, a channel estimator 220, a detector such as an autodetector 225, and a decoder 230. The AFE 210 can include circuitry such as a filter, downconverter, an analog-to-device converter (ADC), or any combination thereof. An ADC can produce time domain samples of a signal received via the one or more antennas 205. The FFT block 215 can transform time domain samples into frequency domain samples. The channel estimator 220 can determine channel information such as channel matrices, noise power, or both. In some implementations, the channel estimator 220 can compute wireless channel matrices for one or more tones of a received symbol.

The autodetector 225 can be configured to perform a frequency domain autodetection technique that uses the output from the FFT block 215 and the channel estimator 220. In some implementations, the autodetector 225 can use channel information from the channel estimator 220 to produce a channel adjusted version of received symbols that account for how a channel distorts transmitted symbols. In some implementations, the autodetector 225 can output an indicator that represents whether a specific symbol within a header portion of a frame has been repeated. The decoder 230 can use this indicator in deciding how to decode a data payload portion of the frame. The autodetector 225 can implement one or more MAP detectors as described herein.

Received signals in the frequency domain can be expressed as $$y_{t,k} = h_{t,k} s_{t,k} + n_{t,k} \quad t=1,2; k=1L\,K$$

where $h_{t,k}$ represents a channel matrix associated with a channel between a transmitter and a receiver for the k-th tone at the t-th time index, $s_{t,k}$ is a symbol vector for the k-th tone at the t-th time index, and $n_{t,k}$ represents a noise vector associated with the k-th tone at the t-th time index. If a first symbol is repeated in transmission as a second symbol, then $s_{1,k} = s_{2,k} = s_k$ and $$H_1 : \begin{cases} y_{1,k} = h_{1,k} s_k + n_{1,k} \\ y_{2,k} = h_{2,k} s_k + n_{2,k} \end{cases}$$

where $H_1$ represents the repeated symbol hypothesis. If a first symbol is not repeated in transmission as a second symbol, then $s_{1,k}$ does not equal $s_{2,k}$ and $$H_0 : \begin{cases} y_{1,k} = h_{1,k} s_{1,k} + n_{1,k} \\ y_{2,k} = h_{2,k} s_{2,k} + n_{2,k} \end{cases}$$

where $H_0$ represents the unrepeated symbol hypothesis. A MAP detector can include components directed to the repeated symbol hypothesis and the unrepeated symbol hypothesis.

A repeated symbol MAP detector can be expressed as $$LLR = \ln \frac{P(H_1 | y_1, y_2)}{P(H_0 | y_1, y_2)} = \ln \frac{\sum_s P(y_1, y_2 | s)}{\sum_{s_1} \sum_{s_2 \neq s_1} \frac{1}{N-1} P(y_1, y_2 | s_1, s_2)} \geq 0 \to H_1$$

where s is a valid sequence of transmitted signals, $s = \{s_1, s_2, \ldots, s_K\}$ with there being N possible sequences in total. Note that $s_1$ and $s_2$ are two valid but different sequences of transmitted signals. Given the channel estimates, a Log-MAP decision metric can be expressed as:

$$LLR_{Log-Map} = \ln \frac{(N-1) \sum_s \exp\left(\sum_{k=1}^{K} \frac{\text{Re}(s_k^*(h_{1,k}^H y_{1,k} + h_{2,k}^H y_{2,k}))}{2\sigma^2}\right)}{\sum_{s_1} \sum_{s_2 \neq s_1} \exp\left(\sum_{k=1}^{K} \frac{\text{Re}(s_{1,k}^* h_{1,k}^H y_{1,k} + s_{2,k}^* h_{2,k}^H y_{2,k})}{2\sigma^2}\right)}$$

where K represents the number of tones within a symbol and $\sigma^2$ represents a noise power.

Another repeated symbol MAP detector, called a MAX-Log-MAP detector, can be expressed as $$LLR_{MAX-Log-MAP} = \max_s \sum_{k=1}^{K} \frac{\text{Re}(s_k^*(h_{1,k}^H y_{1,k} + h_{2,k}^H y_{2,k}))}{2\sigma^2} + \ln N - \max_{s_1, s_2} \sum_{k=1}^{K} \frac{\text{Re}(s_{1,k}^* h_{1,k}^H y_{1,k}) + \text{Re}(s_{2,k}^* h_{2,k}^H y_{2,k})}{2\sigma^2} \geq 0 \to H_1$$

noting that the $LLR_{MAX-Log-MAP}$ includes multiple components including one that contributes to the overall outcome based on the supposition that there is a repeated signal, e.g., repeated symbol, and another component that contributes to the overall outcome based on the supposition that there is not a repeated signal. In some implementations, a MAX-Log-MAP detector can be expressed as $$LLR_{MAX-Log-MAP} = \sum_{k=1}^{K} \frac{\text{Re}(\hat{s}_k^*(h_{1,k}^H y_{1,k} + h_{2,k}^H y_{2,k}))}{2\sigma^2} + \ln N - \sum_{k=1}^{K} \frac{\text{Re}(\hat{s}_{1,k}^* h_{1,k}^H y_{1,k}) + \text{Re}(\hat{s}_{2,k}^* h_{2,k}^H y_{2,k})}{2\sigma^2} \geq 0 \to H_1$$

where $\hat{s}_k^*$, $\hat{s}_{1,k}^*$, and $\hat{s}_{2,k}^*$ are hard decision output, also called a slicer output, of the corresponding equalized signals. The slicer outputs can be expressed as:

$$\hat{s}_k = \text{slicer}(h_{1,k}^H y_{1,k} + h_{2,k}^H y_{2,k})$$

$$\hat{s}_{i,k} = \text{slicer}(h_{i,k}^H y_{i,k}), i = 1, 2$$

where $\hat{s}_k$ and $\hat{s}_{i,k}$ are decoded bits at an output of a decoder. In some implementations, a slicer can compare an input value to points within a group of known constellation points and output a bit value corresponding to the constellation point closest to the input value. In some implementations, an autodetector can include a slicer. In some implementations, an autodetector can use a slicer output from a decoder. In some implementations, a MAX-Log-MAP detector can be expressed as $$LLR_{MAX-Log-MAP} = \sum_{k=1}^{K} \frac{|\text{Re}(h_{1,k}^H y_{1,k} + h_{2,k}^H y_{2,k})|}{2\sigma^2} + \ln N - \sum_{k=1}^{K} \frac{|\text{Re}(h_{1,k}^H y_{1,k})| + |\text{Re}(h_{2,k}^H y_{2,k})|}{2\sigma^2} \geq 0 \to H_1$$

where this detector is designed based on a supposition that the signal is binary phase-shift keying (BPSK) modulated.

Another MAP detector for repeated signals, called a Parameterized MAX-Log-MAP detector, can be expressed as $$LLR_{ParaMAX-Log-MAP} = \max_s \sum_{k=1}^{K} \text{Re}(s_k^*(h_{1,k}^H y_{1,k} + h_{2,k}^H y_{2,k})) + \theta \sigma^2 - \max_{s_1, s_2} \sum_{k=1}^{K} (\text{Re}(s_{1,k}^* h_{1,k}^H y_{1,k}) + \text{Re}(s_{2,k}^* h_{2,k}^H y_{2,k})) \geq 0 \to H_1$$

$$\Downarrow$$

$$\max_{s_1, s_2} \sum_{k=1}^{K} (\text{Re}(s_{1,k}^* h_{1,k}^H y_{1,k}) + \text{Re}(s_{2,k}^* h_{2,k}^H y_{2,k})) - \max_s \sum_{k=1}^{K} \text{Re}(s_k^*(h_{1,k}^H y_{1,k} + h_{2,k}^H y_{2,k})) \geq \theta \sigma^2 \to H_1$$

where θ represents a detection threshold parameter. The detection threshold parameter can be adjusted to account for an approximation error. In some implementations, the real function Re( ) can be changed into a function of absolute value. In some implementations, the detection threshold parameter can be empirically set. In some implementations, the detection threshold parameter can be adapted based on coding parameters or current channel conditions. For example, θ can be a function of a signal-to-noise-ratio (SNR), sequence size, modulation type, coding type, or any combination thereof.

Yet another repeated symbol MAP detector, called a SNR-Independent MAX-Log-MAP detector that is independent of a SNR value or a noise variance value, can be expressed as $$f\left(\frac{\max_s \sum_{k=1}^{K} \text{Re}(s_k^*(h_{1,k}^H y_{1,k} + h_{2,k}^H y_{2,k}))}{\max_{s_1, s_2} \sum_{k=1}^{K} (\text{Re}(s_{1,k}^* h_{1,k}^H y_{1,k}) + \text{Re}(s_{2,k}^* h_{2,k}^H y_{2,k}))}\right) \geq \theta \to H_1$$

where f(•) is a function of a proportion between two components, a repeated symbol component and an unrepeated symbol component, and θ represents a detection threshold parameter. The f(•) function can be a linear function, for example f(x)=x or f(x)=cx+z. In some implementations, a SNR-Independent MAX-Log-MAP detector can be expressed as $$\frac{\max_s \sum_{k=1}^{K} \text{abs}(s_k^*(h_{1,k}^H y_{1,k} + h_{2,k}^H y_{2,k}))}{\max_{s_1,s_2} \sum_{k=1}^{K} (\text{abs}(s_{1,k}^* h_{1,k}^H y_{1,k}) + \text{abs}(s_{2,k}^* h_{2,k}^H y_{2,k}))} \geq \theta \to H_1$$

where abs(•) represents the absolute value function. In some implementations, θ can be selected to be between the 0 and 1 range.

A detection threshold parameter can be based on a minimal distance between constellation points in the I and Q plane. In some implementations, a detection threshold parameter can be expressed as $$\theta = \ln N - \ln\left(1 + \sum_{k=1}^{K} \exp\left(-\frac{\max|\text{Re}(h_{1,k}^H, y_{1,k}) \cdot \Delta_I, \text{Im}(h_{1,k}^H, y_{1,k}) \cdot \Delta_Q|}{2\sigma^2}\right) + \sum_{k=1}^{K} \exp\left(-\frac{\max|\text{Re}(h_{2,k}^H, y_{2,k}) \cdot \Delta_I, \text{Im}(h_{2,k}^H, y_{2,k}) \cdot \Delta_Q|}{2\sigma^2}\right)\right)$$

where $\Delta_I$ and $\Delta_Q$ are the minimal distance between constellation points in I and Q planes, respectively.

FIGS. 3A, 3B, and 3C show different flowcharts of another example of a signal repetition autodetection process. FIG. 3A shows a flowchart of an example of a portion of the process to generate a repeated symbol component of a metric. FIG. 3B shows a flowchart of an example of a portion of the process to generate an unrepeated symbol component of the metric. FIG. 3C shows a flowchart of an example of a portion of the process to generate an indicator based on the metric.

In FIG. 3A, the process generates a repeated symbol component of the metric. At 302, the process selects a known symbol from a group. In some implementations, such a group includes all known symbols are that defined for use within a wireless communication system protocol. At 304, the process determines a subcomponent in accordance with a repeated symbol supposition based on the known symbol, received symbols, and channel information. The known symbol can be compared, for example, via a multiplication operation, to a combination of the received symbols. The channel information can include channel matrices for each of the received symbols. Determining a subcomponent can include iterating through values of the known symbol, received symbols, and channel information that correspond to different tones. In some implementations, a tone can be an OFDM subcarrier. A symbol, such as a known symbol or a received symbol, can collectively refer to values within two or more OFDM subcarriers. At 306, the process determines whether there is another known symbol from the group to select. If there is another known symbol to select, the process continues at 302, to select the next known symbol and determine a subcomponent for the next known symbol. Otherwise, the process, at 308, determines a repeated symbol component based on the subcomponents. In some implementations, determining the repeated symbol component can include performing a summation operation over all of the subcomponents. In some implementations, determining the repeated symbol component can include performing an operation to select the subcomponent having the maximum value. Other approaches to determining the repeated symbol component are possible.

In FIG. 3B, the process generates an unrepeated symbol component of the metric for different pairs of known symbols. At 312, the process selects a known symbol ($s_1$) from the group. At 314, the process selects another known symbol ($s_2$) from the group such that $s_2 \neq s_1$. At 316, the process determines a subcomponent in accordance with an unrepeated symbol supposition based on the known symbols ($s_1$ and $s_2$), received symbols, and channel information. The pair of known symbols can be respectively compared, for example, via separate multiplication operations, to the pair of received symbols. The channel information can include channel matrices for each of the received symbols. Determining a subcomponent can include iterating through values of the known symbols, received symbols, and channel information that correspond to different tones. In some implementations, a tone can be an OFDM subcarrier. A symbol, such as a known symbol or a received symbol, can collectively refer to values within two or more OFDM subcarriers. At 318, the process determines whether there is another known symbol from the group to select for the next $s_2$. If there is another known symbol, the process continues at 314, to select the next known symbol $s_2$ and subsequently determine a subcomponent for the next known symbol. Otherwise, the process, at 320, determines whether there is another known symbol from the group to select for the next Si. If there is another known symbol, the process continues at 312, to select the next $s_1$, subsequently select the next a known symbol $s_2$ given, and determine a subcomponent for the next pair of known symbols. Otherwise, the process, at 322, determines an unrepeated symbol supposition component based on the subcomponents. In some implementations, determining the unrepeated symbol component can include performing a summation operation over all of the subcomponents. In some implementations, determining the unrepeated symbol component can include performing an operation to select the subcomponent having the maximum value. Other approaches to determining the unrepeated symbol component are possible. In some implementations, one or more known symbol pairs can be skipped.

In FIG. 3C, the process generates an indicator based on the metric. At 332, the process determines a detection threshold parameter. Determining a detection threshold parameter can include calculating the detection threshold parameter based on one or more channel matrices and one or more minimal distances between points within a symbol constellation. In some implementations, a detection threshold parameter can be set to zero. At 334, the process determines a MAP metric based on the repeated symbol component and the unrepeated symbol component. In some implementations, a metric value is based on the repeated symbol component minus the unrepeated symbol component. At 336, the process determines whether the metric exceeds the detection threshold parameter. If the metric exceeds the detection threshold parameter, the process at 338a, outputs a repeated symbol detection indicator. If the metric does not exceed the detection threshold parameter, the process at 338b, outputs an unrepeated symbol detection indicator. In some implementations, a decoder can select a decoding format for a data portion of a signal based on the indicator type.

FIG. 4 shows an architecture of an example of a receiver 400 that is configured to perform a frequency domain autodetection technique that uses an equalizer output. The receiver 400 includes one or more antennas 405, an AFE 410, a Fourier transform block such as a FFT block 415, a channel estimator 420, equalizer 425, an autodetector 430, and decoder 440. In some implementations, the receiver 400 is included in a transceiver of a device.

The autodetector 430 can be configured to perform a frequency domain autodetection technique that uses an equalizer output from equalizer 425. For example, each tone of a symbol can be equalized, and the equalizer output, e.g., equalized versions of received symbols, can be used for decision. An equalizer output can be expressed as $$\tilde{y}_{t,k} = \frac{h_{t,k}^H y_{t,k}}{\|h_{t,k}\|^2}$$

with a noise power per tone being expressed as $$\sigma_{t,k}^2 = \frac{\sigma^2}{\|h_{t,k}\|^2}$$

for the k-th tone at the t-th time index. Within the autodetector 430, a MAP detector can use one or more equalized symbols produced by the equalizer 425. In some implementations, an equalizer based Log-MAP detector can be expressed as $$LLR_{Log-MAP-Eq} = \ln \frac{(N-1)\sum_{s} \exp\left(\sum_{k=1}^{K} \text{Re}\left(s_k^* \left(\frac{\tilde{y}_{1,k}}{\sigma_{1,k}^2} + \frac{\tilde{y}_{2,k}}{\sigma_{2,k}^2}\right)\right)\right)}{\sum_{s_1} \sum_{s_2 \neq s_1} \exp\left(\sum_{k=1}^{K} \text{Re}\left(s_{1,k}^* \frac{\tilde{y}_{1,k}}{\sigma_{1,k}^2} + s_{2,k}^* \frac{\tilde{y}_{2,k}}{\sigma_{2,k}^2}\right)\right)}$$

In some implementations, a MAX-Log-MAP detector can select a known symbol from a group of known symbols that maximizes the repeated symbol metric component and can select a pair of known symbols, both being different from each other, from the group of known symbols that maximizes the unrepeated symbol metric component. In some implementations, an equalizer based MAX-Log-MAP detector can be expressed as $$LLR_{MAX-Log-MAP} = \max_{s} \sum_{k=1}^{K} \text{Re}\left(s_k^* \left(\frac{\tilde{y}_{1,k}}{\sigma_{1,k}^2} + \frac{\tilde{y}_{2,k}}{\sigma_{2,k}^2}\right)\right) +$$

$$\ln N - \max_{s_1 \neq s_2} \exp\left(\sum_{k=1}^{K} \text{Re}\left(s_{1,k}^* \frac{\tilde{y}_{1,k}}{\sigma_{1,k}^2} + s_{2,k}^* \frac{\tilde{y}_{2,k}}{\sigma_{2,k}^2}\right)\right)$$

where K is the number of tones and N is the number of symbols in the group of known symbols.

Some implementations can use an average noise power, e.g., average SNR, $\bar{\sigma}^2$. Based on an equal and average noise power across all tones, $$\bar{\sigma}^2 = \frac{1}{2K} \sum_{t=1}^{2} \sum_{k=1}^{K} \sigma_{t,k}^2$$

or

-continued $$\bar{\sigma}^2 = \frac{2K}{\sum_{t=1}^{2} \sum_{k=1}^{K} 1/\sigma_{t,k}^2}$$

where $\sigma_{t,k}^2$ represent a noise power per the k-th tone at the t-th time index. In some implementations, $\bar{\sigma}^2$ is based on a time-domain SNR estimation. Using an average noise power, a Log-MAP detector can be expressed as $$LLR_{Log-MAP} = \ln \frac{(N-1)\sum_{s} \exp\left(\sum_{k=1}^{K} \text{Re}\left(\frac{s_k^*(\tilde{y}_{1,k} + \tilde{y}_{2,k})}{\bar{\sigma}^2}\right)\right)}{\sum_{s_1} \sum_{s_2 \neq s_1} \exp\left(\sum_{k=1}^{K} \text{Re}\left(\frac{s_{1,k}^* \tilde{y}_{1,k} + s_{2,k}^* \tilde{y}_{2,k}}{\bar{\sigma}^2}\right)\right)}$$

Using an average noise power, a MAX-Log-MAP detector can be expressed as $$LLR_{MAX-Log-MAP} = \max_{s} \sum_{k=1}^{K} \text{Re}\left(\frac{s_k^*(\tilde{y}_{1,k} + \tilde{y}_{2,k})}{\bar{\sigma}^2}\right) +$$

$$\ln N - \max_{s_1 \neq s_2} \exp\left(\sum_{k=1}^{K} \text{Re}\left(\frac{s_{1,k}^* \tilde{y}_{1,k} + s_{2,k}^* \tilde{y}_{2,k}}{\bar{\sigma}^2}\right)\right)$$

FIG. 5 shows an architecture of an example of a receiver 500 that is configured to perform a time domain autodetection technique. The receiver 500 includes one or more antennas 505, an AFE 510, a Fourier transform block such as a FFT block 515, a channel estimator 520, an autodetector 525, and decoder 530. The AFE 510 can include circuitry such as a filter, downconverter, an ADC, or a combination thereof. An ADC can produce samples of a signal received via the one or more antennas 505. The autodetector 525 can be implemented in the time-domain. The autodetector 525 can collect, in the time domain, samples $r_{1,k}$, $r_{2,k}$ associated with two or more received symbols from an ADC within the AFE 510.

Time domain samples $r_{1,k}$, $r_{2,k}$ can be used to detect if a duplicated OFDM symbol is transmitted. In some implementations, the autodetector 525 can use $$\sum_{n=1}^{N_{FFT}} \text{Re}(r_{1,n}^H r_{2,n}) \geq \lambda \rightarrow H_1$$

$$\sum_{n=1}^{N_{FFT}} \text{abs}(r_{1,n}^H r_{2,n}) \geq \lambda \rightarrow H_1$$

to perform a correlation. In some implementations, the autodetector 525 can make a MAP decision based on time-domain signals. The detector can use the following LLR metric $$LLR = \ln \frac{P(r_1, r_2 | H_1)}{P(r_1, r_2 | H_0)} \geq 0 \rightarrow H_1$$

where $P(r_1,r_2|H_1)$ represents a repeated symbol component of the metric and $P(r_i,r_2|H_0)$ represents an unrepeated symbol component of the metric. In more detail, the LLR metric can be computed based on:

$$LLR = \frac{\rho}{(\sigma_n^2 + \sigma_s^2)(1-\rho^2)} \sum_{k=1}^{K}\left(\text{Re}(r_{1,k}^H r_{2,k}) - \rho\left(\frac{\|r_{1,k}\|^2 + \|r_{2,k}\|^2}{2}\right)\right) \Rightarrow$$

$$\sum_{k=1}^{K}\left(\text{Re}(r_{1,k}^H r_{2,k}) - \rho\left(\frac{\|r_{1,k}\|^2 + \|r_{2,k}\|^2}{2}\right)\right) \geq 0 \rightarrow H_1$$

where $$\rho = \frac{\sigma_s^2}{\sigma_s^2 + \sigma_n^2} = \frac{SNR}{1+SNR}$$

and where $\|r_{1,k}\|$ and $\|r_{2,k}\|$ represent normalized samples, and where $\sigma_s^2$ and $\sigma_n^2$ represent the power of the signal and noise respectively. In some implementations, channel estimator 520 can produce SNR values that are used to compute the LLR metric.

FIGS. 6A and 6B show different examples of a frame layout with a repeated symbol in a header portion of a frame. A wireless communication system can include a multi-mode frame format which is indicated by a signal repetition, repeated symbol, without explicit signaling. For example, a next generation standard of the IEEE 802.11 family may use signal repetition to indicate that a frame is a next generation frame. In IEEE 802.11, a signal repetition can include a repetition of a legacy signal field (L-SIG) or a repetition of a HE signal field (HE-SIG) repetition. Other types of repetitions are possible. A device can be configured to detect the signal repetition for the processing of a subsequent portion of a frame. For example, if there is no signal repetition, e.g., no L-SIG or HE-SIG repetition, a subsequent frame portion can be decoded based on a first frame format, whereas if there is signal repetition, the subsequent frame portion can be decoded based on a second, different frame format. The L-SIG or HE-SIG can be repeated for a total of two or more occurrences.

FIG. 6A shows an example of a frame layout with a repeated L-SIG symbol in a header portion of a frame 601. The L-SIG symbols can be adjacent to each other within the header portion. Note that a guard interval (GI) can separate different occurrences of the L-SIG symbols. The payload portion of the frame 601 can be decoded based on a format selected in accordance with whether the L-SIG symbol was repeated within the header portion. The L-SIG symbols can be preceded by one or more other symbols such as a legacy long training field (L-LTF).

FIG. 6B shows another example of a frame layout 602 with a repeated HE-SIG symbol in a header portion of a frame 602. The HE-SIG symbols can be adjacent to each other within the header portion. A GI can separate different occurrences of the HE-SIG symbols. In some implementations, the payload portion of the frame 602 can be decoded based on a format selected in accordance with whether the HE-SIG symbol was repeated within the header portion. In some implementations, HE-SIG1 and HE-SIG2 carry different types of signaling. For example, HE-SIG1 can carry signaling for all receives, whereas HE-SIG2 can carry signaling for an intended receiver.

In some implementations, a repeated symbol detector can be based on inter-symbol comparisons of hard decision output values. Such a detector can compare the slicer output for each symbol:

$$\hat{s}_{i,k} = \text{slicer}(h_{i,k}^H y_{i,k}), i=1,2$$

and count the number of identical decisions and compare to a threshold to detect repeated symbols:

$$S = \sum_{k=1}^{K} 1(\hat{s}_{1,k} = \hat{s}_{2,k}) \geq K_1 \rightarrow H_1$$

The threshold can also be empirically set or adapted according to SNR and other parameters. In some implementations, the slicer does not have to be employed to count the identical decisions across tones. For example, a detector can count the sign of cross-correlations:

$$S = \sum_{k=1}^{K} \text{sign}(\text{Re}(y_{1,k})\text{Re}(y_{2,k})) \geq K_1 \rightarrow H_1$$

if BPSK is used.

An autodetector, in some implementations, can be configured to use a channel decoder decision. Signals can be encoded using a Binary Convolutional Code (BCC). For L-SIG, an independent BCC decoding can be applied for each received symbol. For HE-SIG, a partial Viterbi decoding can be applied for each received symbol. In some implementations, a HE-SIG can be longer than one OFDM symbol, and only the first OFDM symbol of the HE-SIG can be duplicated. Based on the decoder output (soft or hard), a detection can be made. For example, a hard output decision metric can be expressed as $$\hat{b}_{i,m} = dec(y_{i,k}; h_{i,k}), i = 1, 2 \Rightarrow S = \sum_{m=1}^{M} 1(\hat{b}_{1,m} = \hat{b}_{2,m}) \geq M_1 \rightarrow H_1$$

In another example, a soft output decision metric can be expressed as $$\Lambda_{i,m} = \text{soft\_dec}(y_{i,k}; h_{i,k}), i = 1, 2 \Rightarrow \sum_{m=1}^{M} f(\Lambda_{1,m}, \Lambda_{2,m}) \geq \varepsilon \rightarrow H_1$$

In another example, a re-encode decision metric can be expressed as $$\hat{b}_{i,m} = dec(y_{i,k}; h_{i,k}), i = 1,$$

$$2 \Rightarrow \hat{s}_i = enc(\hat{b}_{i,m}, m = 1L\ M) \Rightarrow S = \sum_{k=1}^{K} 1(\hat{s}_{1,k} = \hat{s}_{2,k}) \geq K_1' \rightarrow H_1$$

FIG. 7 shows an example of a wireless network with two wireless communication devices. Wireless communication devices 705a, 705b such as an access point (AP), base station (BS), wireless headset, access terminal (AT), client station, or mobile station (MS) can include circuitry such as one or more processors 710a, 710b, which can be programmed to implement one or more techniques presented in this disclosure. Wireless communication devices 705a, 705b can include circuitry such as transceivers 715a, 715b to send and receive wireless signals over one or more antennas 720a, 720b. In some implementations, transceivers 715a, 715b can include an integrated transmitter and receiver circuitry. In some implementations, transceivers 715a, 715b can include separate transmitter circuitry and receiver circuitry. Wireless communication devices 705a, 705b can include one or more memories 725a, 725b configured to store information such as data, instructions (e.g., which operate on the one or more processors 710a, 710b), or both. In some implementations, one or more transceivers 715a, 715b can be configured with an autodetection technique. In some implementations, one or more processors 710a, 710b can be configured with an autodetection technique.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Other embodiments fall within the scope of the following claims.

What is claimed is:

1. A system comprising:
    circuitry configured to receive a frame comprising a first portion and a second portion, the first portion comprising a first signal field and a second signal field;
    a detector configured to (i) determine a first decision metric component that is based on a hypothesis that the second signal field is a repeated version of the first signal field, (ii) determine a second decision metric component that is based on a hypothesis that the second signal field is not the repeated version of the first signal field, and (iii) make a determination, based on the first decision metric component and the second decision metric component, of whether the second signal field is the repeated version of the first signal field; and
    a decoder coupled with the detector, the decoder configured to process the second portion of the frame in accordance with a first format responsive to the determination indicating that the second signal field is not the repeated version of the first signal field, and to decode the second portion of the frame in accordance with a second format responsive to the determination indicating that the second signal field is the repeated version of the first signal field.

2. The system of claim 1, wherein the first signal field comprises a legacy signal (L-SIG) field, wherein the second signal field comprises a repeated version of the L-SIG field, and wherein the decoder configured to decode the second portion of the frame in accordance with the second format responsive to a determination indicating that the L-SIG field is repeated within the first portion of the frame.

3. The system of claim 1, wherein the first signal field and the second signal field are separated by a guard interval.

4. The system of claim 1, wherein the detector is configured to make the determination using a detection threshold parameter, wherein the detection threshold parameter is based on one or more channel matrices and one or more minimal distances between points within a symbol constellation associated with the first portion of the frame.

5. The system of claim 4, wherein the detector is configured to determine a maximum a posterior decision metric from the first decision metric component and the second decision metric component, and wherein the detector is configured to make the determination by performing a comparison between the maximum a posterior decision metric and the detection threshold parameter.

6. The system of claim 1, comprising:
    circuitry configured to collect, in a time domain, first samples associated with the first signal field, and collect, in the time domain, second samples associated with the second signal field,
    wherein the detector is configured to determine the first decision metric component from a summation of products between the first samples and the second samples, and determine the second decision metric component from normalized versions of the first samples and normalized versions of the second samples.

7. The system of claim 1, wherein the detector is configured to determine an equalized version of a first symbol of the first signal field from a first wireless channel matrix to produce a first equalized symbol, wherein the detector is configured to determine an equalized version of a second symbol of the second signal field from a second wireless channel matrix to produce a second equalized symbol, and wherein the detector is configured to use the first equalized symbol and the second equalized symbol to determine whether the second signal field is the repeated version of the first signal field.

8. A device comprising:
    a receiver configured to receive a frame comprising a first portion and a second portion, the first portion comprising a first signal field and a second signal field; and
    a processor coupled with the receiver, wherein the processor is programmed to determine a first decision metric component that is based on a hypothesis that the second signal field is a repeated version of the first signal field, and determine a second decision metric component that is based on a hypothesis that the second signal field is not the repeated version of the first signal field,
    wherein the processor is programmed to make a determination, based on the first decision metric component and the second decision metric component, of whether the second signal field is the repeated version of the first signal field, and
    wherein the processor is programmed to decode the second portion of the frame in accordance with a first format responsive to the determination indicating that the second signal field is not the repeated version of the first signal field, and to decode the second portion of the frame in accordance with a second format responsive to the determination indicating that the second signal field is the repeated version of the first signal field.

9. The device of claim 8, wherein the first signal field comprises a legacy signal (L-SIG) field, wherein the second signal field comprises a repeated version of the L-SIG field, and wherein the processor is programmed to decode the second portion of the frame in accordance with the second format responsive to a determination indicating that the L-SIG field is repeated within the first portion of the frame.

10. The device of claim 8, wherein the first signal field and the second signal field are separated by a guard interval.

11. The device of claim 8, wherein the processor is programmed to determine a detection threshold parameter from one or more channel matrices and one or more minimal distances between points within a symbol constellation associated with the first portion of the frame, and determine a maximum a posterior decision metric from the first decision metric component and a second decision metric component, and wherein the determination is based on a comparison between the maximum a posterior decision metric and the detection threshold parameter.

12. The device of claim 8, wherein the processor is programmed to collect, in a time domain, first samples associated with the first signal field, and collect, in the time domain, second samples associated with the second signal field, and wherein the processor is programmed to determine the first decision metric component from a summation of products between the first samples and the second samples, and determine the second decision metric component from normalized versions of the first samples and normalized versions of the second samples.

13. The device of claim 8, wherein the processor is programmed to determine an equalized version of a first symbol of the first signal field from a first wireless channel matrix to produce a first equalized symbol, wherein the processor is programmed to determine an equalized version of a second symbol of the second signal field from a second wireless channel matrix to produce a second equalized symbol, and wherein the processor is programmed to use the first equalized symbol and the second equalized symbol to determine whether the second signal field is the repeated version of the first signal field.

14. A method comprising:
receiving a frame comprising a first portion and a second portion, the first portion comprising a first signal field and a second signal field;
determining a first decision metric component that is based on a hypothesis that the second signal field is a repeated version of the first signal field;
determining a second decision metric component that is based on a hypothesis that the second signal field is not the repeated version of the first signal field;
performing a determination, based on the first decision metric component and the second decision metric component, of whether the second signal field is the repeated version of the first signal field; and
decoding the second portion of the frame in accordance with a first format or a second format, wherein the first format, is used for decoding based on the determination indicating that the second signal field is not the repeated version of the first signal field, and wherein the second format is used for decoding based on the determination indicating that the second signal field is the repeated version of the first signal field.

15. The method of claim 14, wherein the first signal field comprises a legacy signal (L-SIG) field, and wherein the second signal field comprises a repeated version of the L-SIG field, and wherein performing the determination comprises determining that the L-SIG field is repeated in the first portion of the frame.

16. The method of claim 14, wherein the first signal field and the second signal field are separated by a guard interval.

17. The method of claim 14, wherein the performing the determination comprises using a detection threshold parameter based on one or more channel matrices and one or more minimal distances between points within a symbol constellation associated with the first portion of the frame.

18. The method of claim 17, wherein the performing the determination comprises:
determining a maximum a posterior decision metric from the first decision metric component and a second decision metric component; and
comparing the maximum a posterior decision metric and the detection threshold parameter.

19. The method of claim 14, comprising:
collecting, in a time domain, first samples associated with the first signal field; and
collecting, in the time domain, second samples associated with the second signal field,
wherein the performing the determination comprises determining the first decision metric component from a summation of products between the first samples and the second samples, and determining the second decision metric component from normalized versions of the first samples and normalized versions of the second samples.

20. The method of claim 14, comprising:
determining an equalized version of a first symbol of the first signal field from a first wireless channel matrix to produce a first equalized symbol; and
determining an equalized version of a second symbol of the second signal field from a second wireless channel matrix to produce a second equalized symbol, and
wherein the performing the determination comprises using the first equalized symbol and the second equalized symbol.

* * * * *